United States Patent [19]

Iwata et al.

[11] Patent Number: 5,060,910
[45] Date of Patent: Oct. 29, 1991

[54] FLOW CONTROL DEVICE

[75] Inventors: Kouichi Iwata; Hiroki Yamamoto; Katsuyoshi Fukaya, all of Oobu, Japan

[73] Assignee: Aisan Kogyo Kabushiki Kaisha, Aichi, Japan

[21] Appl. No.: 668,631

[22] Filed: Mar. 13, 1991

[30] Foreign Application Priority Data

Mar. 15, 1990 [JP] Japan ................................ 2-26432[U]

[51] Int. Cl.$^5$ ............................................ F16K 31/04
[52] U.S. Cl. .......................... 251/129.05; 251/129.11; 251/266
[58] Field of Search ...................... 251/129.11, 129.12, 251/129.13, 266, 129.05

[56] References Cited

U.S. PATENT DOCUMENTS 4,723,753 2/1988 Torimoto et al. ......... 251/129.11 X

Primary Examiner—Arnold Rosenthal
Attorney, Agent, or Firm—Koda and Androlia

[57] ABSTRACT

A flow control device wherein a valve member is reciprocated linearly by the rotation of a rotor of a stepping motor to change the flow rate of air flowing through an air passage in a housing. To the rotor of the stepping motor is fixed a shaft having external threads. A guide member with a valve member fixed thereto has internal threads for threaded engagement with the external threads of the shaft and also has a stepped, axial bore for fixing the valve member. The valve member is fixed at a sleeve portion thereof to the stepped, axial bore of the guide member. An annular sliding bearing and a wave washer are inserted between the stepped portion of the axial bore of the guide member and an end face of the sleeve portion of the valve member. A small gap is formed between the inner wall of the axial bore of the guide member and the outer peripheral surface of the sliding bearing and also between the outer peripheral surface of the shaft and the inner peripheral surface of the sliding bearing, thereby permitting the sliding bearing to move radially and axially with respect to the shaft.

10 Claims, 2 Drawing Sheets

FLOW CONTROL DEVICE

BACKGROUND OF THE INVENTION

1. Field of the Invention

The present invention relates to a flow control device, for example a flow control device serving as an idling speed controller which functions to adjust the flow rate of air flowing through a by-pass passage of an intake system, in accordance with an idling speed of an internal combustion engine for a vehicle.

2. Description of the Prior Art

As a flow control device applied heretofore to an idling speed controller for an internal combustion engine for a vehicle, there is known a flow control device wherein forward and reverse rotations of the the shaft of a stepping motor are converted into a reciprocating motion of a valve member disposed in a by-pass passage formed within a housing.

In such conventional flow control device, the shaft of the stepping motor and a cylindrical guide member mounted on the outer periphery of the shaft are threadedly engaged with each other, and there is provided means for inhibiting the rotation of the guide member, whereby forward and reverse rotations of the shaft of the stepping motor are converted into a reciprocating motion of the guide member, and the aforementioned valve member, which is fixed to the front end of the guide member, is allowed to approach to and leave from a valve seat provided within the by-pass passage. With this reciprocating motion of the valve member, the flow path area of the by-pass passage increases or decreases to control the flow rate of air flowing through the by-pass passage.

In the above conventional flow control device, the valve member is usually positioned away from a bearing for rotatably supporting the foregoing shaft, so that it sometimes vibrates largely during its reciprocating motion or when an external vibration is exerted thereon. To avoid these defects, it may be effective to support the guide member at a position near the valve member by means of a bearing. In this case, however, if there is a poor portion in relative sliding between the guide member and the bearing, this portion will badly influences the motion of the valve member, resulting in deteriorated control accuracy for the flow rate of air flowing through the by-pass passage.

Further, in the case where a large amount of air flowing through the by-pass passage is required, the maximum flow rate of the air flowing through the by-pass passage is restricted by a flow resistance of the bearing which supports the guide member.

SUMMARY OF THE INVENTION

It is a primary object of the present invention to provide a flow control device wherein a guide member provided with a valve member can be reciprocated smoothly with respect to a valve seat and which is superior in the flow control accuracy.

It is another object of the present invention to provide a flow control device wherein means for absorbing external vibrations is provided between the shaft of a stepping motor and unitary construction of the guide member and the valve member to ensure a smooth and accurate approaching or leaving motion of the valve member with respect to the valve seat.

In accordance with the present invention, there is provided a flow control device including a motor case; a stepping motor comprising a stator fixed to the motor case and a rotor coaxial with the stator and supported rotatably in the motor case; a shaft fixed to the rotor of the stepping motor coaxially with a central rotational axis of the rotor; a housing fixed to the motor case, having at least two air flow holes and an air passage formed between the air flow holes communicating said holes with each other; a guide member mounted on the shaft and capable of being moved toward or away from a valve seat disposed in one of said air flow holes of the housing by rotation of said shaft; and a valve member fixed to the front end of said guide member and capable of sitting on said valve seat.

The guide member is formed with an axial bore having a cylindrical inner wall coaxial with a central rotational axis of said shaft and a stepped portion projecting radially inwards from said inner wall at an end portion thereof on the side close to the valve seat. Said valve member is integrally provided with a valve element capable of sitting on said valve seat and a sleeve portion inserted into said axial bore of the guide member and secured to said cylindrical inner wall of the guide member. Into said axial bore of the guide member are also inserted a sliding bearing member and an elastic member in the portion between said stepped portion of the axial bore and an end face of the sleeve portion of said valve member. The Said sliding bearing member is in the form of a ring having a central hole, through which said shaft is inserted. The central hole of said sliding bearing member is formed to have an inside diameter which is slightly larger than the outside diameter of the shaft which is inserted through the central hole, while the outer peripheral surface of the sliding bearing member is formed to have an outside diameter which is slightly smaller than the inside diameter of the cylindrical inner wall of the axial bore. When one of the axial end faces of the sliding bearing member is in abutment with the stepped portion of the axial bore or with an end face of the sleeve portion of the valve member, a gap of a predetermined size is formed between the other axial end face of the sliding bearing member and the end face of the sleeve portion of the valve member or the stepped portion, and said elastic member is inserted into the gap to bring the one end face of the sliding bearing member into pressure contact elastically with the stepped portion or with the end face of the sleeve portion of the valve member. Preferably, the elastic member is a wave washer formed in the shape of a ring.

According to the present invention, the vibration of the valve member is suppressed by the sliding bearing member. Even if there is a poor portion in relative sliding between the sliding bearing member and the shaft of the stepping motor, the unsmooth movement is absorbed by radial and axial movements of the sliding bearing member to ensure a smooth slide. Consequently, the reciprocating motion of the valve member is kept appropriate.

Further, since the sliding bearing member is positioned inside the guide member, the sliding bearing member is prevented from acting as a flow resistance against the air flowing through the air passage.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DESCRIPTION OF THE PREFERRED EMBODIMENT

An embodiment of the present invention will be described below with reference to the accompanying drawings. The embodiment the flow control device according to the invention is applied to as an idling speed controller in an intake system of an internal combustion engine for a vehicle in which a fuel injection valve (injector) is utilized.

Figure 1:
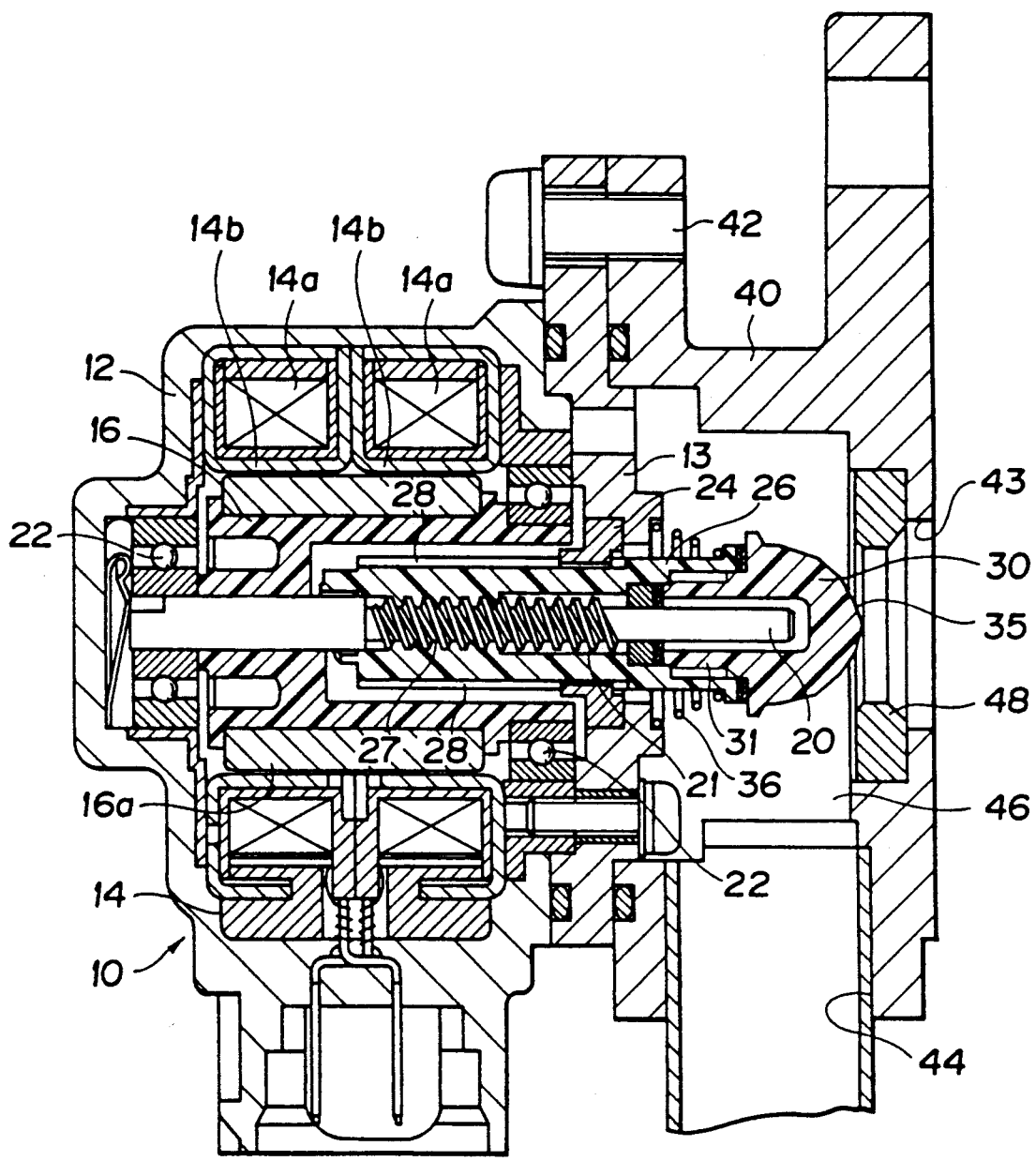
FIG. 1 is a sectional view of an embodiment of a flow control device according to the present invention functioning as an idling speed controller for an internal combustion engine for a vehicle.
Figure 2:
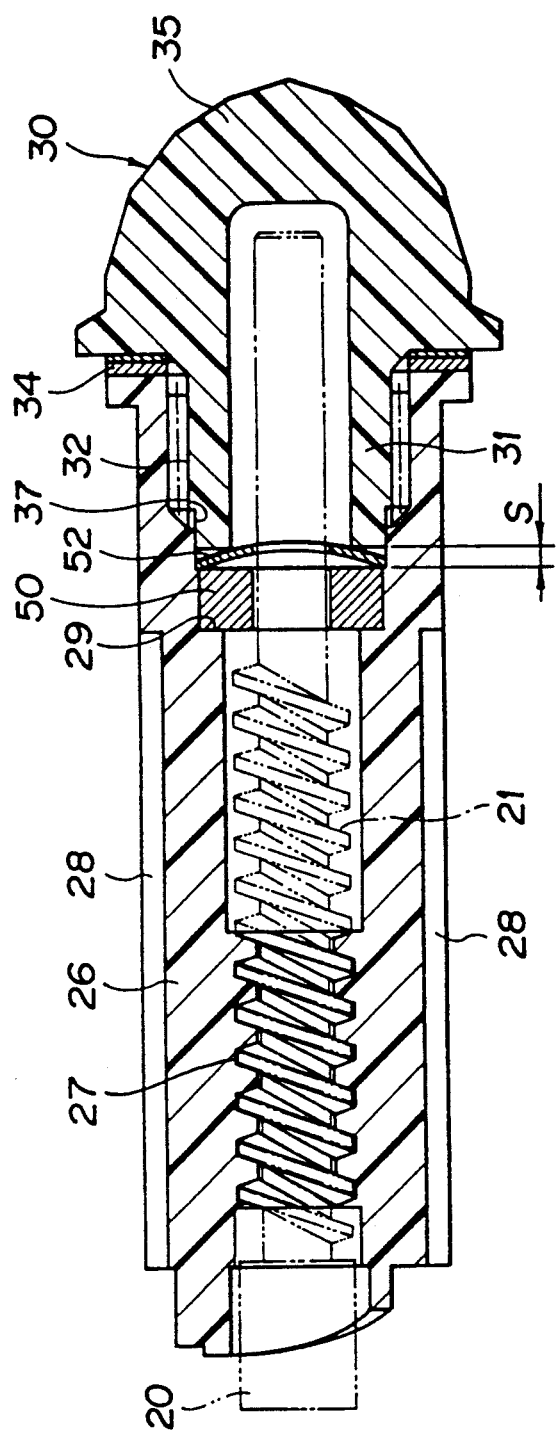
FIG. 2 is an enlarged sectional view of a guide member and a valve member both used in the flow control device shown in FIG. 1.

The idling speed controller is illustrated as a sectional view in FIG. 1, and a principal portion of FIG. 1 is illustrated as an enlarged sectional view in FIG. 2. First in FIG. 1, a stepping motor 10 is provided with a motor case 12, a stator 14 mounted in the interior of the motor case 12 and a rotor 16 rotatably accommodated in a hollow portion of a stator 14. The stator 14, the rotor 16 and other related members are assembled into the motor case 12 through a right-hand opening of the motor case in the figure, which opening is thereafter closed with a flange plate 13.

The stator 14 is provided with ring-like stator coils 14a and magnetic poles 14b. The rotor 16 is provided on the outer periphery thereof with a multipole permanent magnet 16a, and a base portion of a shaft 20 is press-fitted and fixed into the rotor 16 coaxially with a rotational axis of the rotor 16. Upon input of an electronic signal to the coil 14a from an engine controller (not shown), the rotor 16 rotates forward or reverse together with the shaft 20 in accordance with the signal.

The rotor 16 is supported at both axial ends thereof by ball bearings 22 rotatably with respect to the motor case 12. External threads 21 are formed on the outer periphery of an intermediate portion of the shaft 20.

A cylindrical guide member 26 formed by a synthetic resin is mounted on the outer periphery of the shaft 20. Internal threads 27 are formed on the inner periphery of the guide member 26 and are threadedly engaged with the external threads 21 of the shaft 20. Both threads 21 and 27 function as feed screws.

The outer peripheral surface of the guide member 26 is supported slidably by a sliding bearing 24 fixed to the flange plate 13. The sliding bearing 24 has a projections which engage with grooves 28 formed in the outer peripheral surface of the guide member 26 in parallel with the central axis of the guide member 26, thereby functioning as a swivel stop for the guide member 26. Therefore, when the rotor 16 is driven and the shaft 20 is thereby rotated forward or reverse, the guide member 26 reciprocates in the right or left directions in FIG. 1 along the axis thereof.

To the motor case 12 is fixed a housing 40 with bolts 42 through the flange plate 13. The housing 40 has at least two air flow holes 43, 44, and an air passage 46 which communicates the air flow holes 43 and 44 with each other, thereby the air passage 46 which serves as a by-pass passage in the intake system of the internal combustion engine is formed within a space formed by the housing 40 and the flange plate 13. In the air passage 46, a valve seat 48 is fixed to the housing 40 coaxially with the shaft 20 and the guide membwer 26.

A valve member 30 is fixed to the end portion of the guide member 26 at a position opposed to the valve seat 48 in the air passage 46. Therefore, with the reciprocating motion of the guide member 26, a valve element 35 of the valve member 30 approaches to or leaves from the valve seat 48, whereby the flow rate of the air flowing through the air passage 46 is controlled.

As is apparent also from FIG. 2, the valve member 30 has a sleeve portion 31 which is integral with the valve element 35. The sleeve portion 31 is inserted into an axial bore 37 formed axially in the front end of the guide member 26 and is threadedly fixed with a screw 32 to a cylindrical inner wall of the axial bore 37. If necessary, an adhesive or ultrasonic welding may be used for fixing the sleeve portion 31 to the valve element at portion indicated by reference numeral 32. Further, a shim 34 is interposed between an end face of the guide member 26 and the valve element 35 of the valve member 30. The height (spaced distance) of the valve element 35 relative to the valve seat 48 can be adjusted by adjusting the thickeness of the shim 34.

Like the guide member 26, the valve member 30 is formed using a synthetic resin and hence is lightweight in comparison with conventional metallic guide elements. This means that the internal threads 27 of the guide member 26 which constitute the foregoing feed screw are less deteriorated and the load on the stepping motor 10 is lower, so the torque required for reciprocating the guide member 26 and the valve member 30 is decreased. Besides, the valve member 30 formed of a synthetic resin is easily colored and distinguishable.

The cylindrical inner wall of the axial bore 37 of the guide member 26 is formed with a stepped portion 29 projecting radially inwards, and a sliding bearing 50 formed in the shape of a ring is mounted between the end face of the sleeve portion 31 of the valve member 30 and the stepped portion 29 opposed thereto. The sliding bearing 50 is formed so that the outside diameter thereof is slightly smaller than the inside diameter of the cylindrical inner wall of the axial bore 37 and the inside diameter of a central hole thereof is slightly larger than the outside diameter of a cylindrical portion formed at the front end of the shaft 20. In the figure, the left-hand end face of the sliding bearing 50 is pushed against the stepped portion 29, and an axial gap S is formed between the right-hand end face of the sliding bearing 50 and the end face of the sleeve portion 31. Further, in the gap S is mounted an annular wave washer 52 as an elastic member capable of undergoing elastic deformations in the axial direction.

As shown in FIG. 1, between the flange plate 13 of the motor case 12 and a flange formed on the outer periphery of the end portion of the guide member 26 on the side of the valve member 30, a conical spring 36 is disposed coaxially with the shaft 20.

In the idling speed controller of the above construction, when the shaft 20 rotates forward and reverse together with the rotor 16 of the stepping motor 10, the guide member 26 reciprocates in the right and left directions in the figure together with the valve member 30.

More specifically, as the rotor 16 and the shaft 20 rotate to move the guide member 26 rightward in the figure, the valve element 35 of the valve member 30 approaches to the valve seat 48 gradually, so that the flow path area of the air flowing through the valve seat 48 and the air passage 46 decreases gradually. When the delivery of the guide member 26 becomes maximum, the valve element 35 of the valve member 30 contacts the valve seat 48 to close the air passage 46.

On the other hand, when the rotor 16 and the shaft 20 rotate reverse to move back the guide member 26 leftward in the figure, the valve element 35 of the valve member 30 gradually moves away from the valve seat 48, so that the flow path area of the air flowing through the valve seat 48 and the air passage 46 increases gradually.

The guide member 26 is supported by a sliding bearing 50 in a position closer to the valve member 30 with respect to the shaft 20 of the stepping motor 10, so that during the foregoing reciprocating motion of the valve member 30 or under external vibrations, a relative vibration of the guide member 26 and the valve member 30 is suppressed. Consequently, the durability of the internal threads 27 of the guide member 26 which constitute the foregoing feed screw is improved and the flow rate controlling accuracy for the by-pass air flowing through the air passage 46 is also improved.

The sliding bearing 50 is movable radially and axially according to loads imposed thereon. Therefore, even if there is a poor portion in relative sliding between the sliding bearing 50 and the shaft 20 of the stepping motor 10 during the guide member 26 is moving in the direction (leftward in the figure) to open the valve member 30, the movement of the guide member 26 and that of the valve member 30 are kept smooth by axial elastic deformations of the wave washer 52 and also by a relative movement of the cylindrical inner wall of the axial bore 37 of the guide member 26 and the sliding bearing 50.

On the other hand, when there is a poor portion in relative sliding between the sliding bearing 50 and the shaft 20 during the guide member 26 is moving in the direction (rightward in the figure) to close the valve member 30, the movement of the guide member 26 and that of the valve member 30 are kept smooth by radial movements of the sliding bearing 50 in the gap formed between the cylindrical outer surface of the sliding bearing 50 and the cylindrical inner wall of the axial bore 36 and also in the gap between the cylindrical inner surface of the sliding bearing 50 and the peripheral wall of the front end portion of the shaft 20 and further by elastic deformations of the conical spring 36.

Since the sliding bearing 50 is positioned in the interior of the guide member 26, it is prevented from acting as a flow resistance to the air flowing through air passage 46, i.e. the by-pass passage.

Although an embodiment of the present invention has been described above, the invention is not limited thereto and various modifications may be made.

For example, the wave washer 52 may be replaced with an elastic member of another shape such as a coil spring or of another material. Further, the gap S formed in the axial bore 37 of the guide member 26 for insertion therein of an elastic member such as the wave washer 52 may be provided between the stepped portion 29 and an end face of the sliding bearing 50 (the left-hand end face in the figure) opposed to the stepped portion 29.

What is claimed is:

1. A flow control device comprising:
    a motor case;
    a stepping motor comprising a stator fixed to said motor case and a rotor coaxial with said stator and rotatably supported by said motor case;
    a shaft fixed to the rotor of said stepping motor coaxially with a central rotational axis of the rotor;
    a housing fixed to said motor case, having at least two air flow holes and defining an air passage communicating said air flow holes with each other;
    a guide member mounted on said shaft fixed to the rotor of said stepping motor, said guide member being operated by rotation of said shaft so as to approach to or leave from a valve seat disposed in said air passage of said housing, said guide member having an axial bore formed in an end portion thereof on the side closer to said valve seat, said axial bore having a cylindrical inner wall concentric with a central rotational axis of said shaft and a stepped portion extended radially inwardly from the end of said cylindrical inner wall;
    a valve member integrally provided with a valve element capable of sitting on said valve seat and a sleeve portion inserted into said axial bore of said guide member and fixed to said cylindrical inner wall;
    an annular sliding bearing member inserted into said axial bore of said guide member in a position between said stepped portion and the terminal end of said sleeve portion of said valve member, and having an outer peripheral surface whose outside diameter is slightly smaller than the inside diameter of said cylindrical inner wall of said axial bore and also having a central hole whose inside diameter is slightly larger than the outside diameter of said shaft, with said shaft being inserted through said central hole; and
    an elastic member also inserted into said axial bore of said guide member within a gap formed between one of axial end faces of said stepped portion of an axial end face of said sleeve portion of said valve member and one of axial end faces of said sliding bearing member to bring the other end face of the sliding bearing member into pressure contact elastically with the other one of the axial end faces of the stepped portion and the axial end face of the sleeve portion of the valve member.

2. A flow control device according to claim 1, wherein said shaft has a base portion fixed to the rotor of said stepping motor, an intermediate portion having external threads for threaded engagement with said guide member, and a front end portion formed in a cylindrical shape; and said front end portion of said shaft is inserted through said central hole of said sliding bearing member.

3. A flow control device according to claim 1, wherein said elastic member is inserted into a gap formed between an axial end face of said sleeve portion of said valve member and one of axial end faces of said sliding bearing member to bring the other end face of the sliding bearing member into pressure contact elastically with said stepped portion formed in the axial bore of said guide member.

4. A flow control device according to claim 1, wherein a shim is interposed between a stepped portion formed between said valve element and said sleeve portion of said valve member and an axial end face of the free end of said guide member.

5. A flow control device according to claim 1, wherein said rotor of said stepping motor is supported at both axial ends thereof rotatably by said motor case through bearings; said shaft is fixed to first axial end of said rotor; said rotor has a central hole which is opened in second axial end of said rotor and which is coaxial with a central rotational axis of the rotor, part of said guide member is inserted into said central hole; a flange plate fixed to said motor case is disposed perpendicularly to the central rotational axis of the rotor in a position adjacent to said bearing which supports the second axial end of the rotor, said flange plate has an opening into which is fixed a sliding bearing for slidably supporting said guide member; and a conical spring is disposed between said flange plate and the free end of said guide member.

6. A flow controll device according to claim 2, wherein said elastic member is inserted into a gap formed between an axial end face of said sleeve portion of said valve member and one of axial end faces of said sliding bearing member to bring the other end face of the sliding bearing member into pressure contact elastically with said stepped portion formed in the axial bore of said guide member.

7. A flow control device according to claim 2, wherein a shim is interposed between a stepped portion formed between said valve element and said sleeve portion of said valve member and an axial end face of the free end of said guide member.

8. A flow control device according to claim 2, wherein said rotor of said stepping motor is supported at both axial ends thereof rotatably by said motor case through bearings; said shaft is fixed to first axial end of said rotor; said rotor has a central hole which is opened in second axial end of said rotor and which is coaxial with a central rotational axis of the the rotor, part of said guide member is inserted into said central hole; a flange plate fixed to said motor case is disposed perpendicularly to the central rotational axis of the rotor in a position adjacent to said bearing which supports the second axial end of the rotor, said flange plate has an opening into which is fixed a sliding bearing for slidably supporting said guide member; and a conical spring is disposed between said flange plate and the free end of said guide member.

9. A flow control device according to claim 3, wherein a shim is interposed between as stepped portion formed between said valve element and said sleeve portion of said valve member and an axial end face of the free end of said guide member.

10. A flow control device according to claim 3, wherein said rotor of said stepping motor is supported at both axial ends thereof rotatably said motor case through bearings; said shaft is fixed to first axial end of said rotor; said rotor has a central hole which is opened in second axial end of said rotor and which is coaxial with a central rotational axis of the rotor, part of said guide member is inserted into said central hole; a flange plate fixed to said motor case is disposed perpendicularly to the central rotational axis of the rotor in a position adjacent to said bearing which supports the second axial end of the rotor, said flange plate has an opening into which is fixed a sliding bearing for slidably supporting said guide member; and a conial spring is disposed between said flange plate and the free end of said guide member.

* * * * *